(12) United States Patent
Boyle et al.

(10) Patent No.: US 7,672,072 B1
(45) Date of Patent: Mar. 2, 2010

(54) DISK DRIVE MODIFYING AN UPDATE FUNCTION FOR A REFRESH MONITOR IN RESPONSE TO A MEASURED DURATION

(75) Inventors: William B. Boyle, Lake Forest, CA (US); Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 278 days.

(21) Appl. No.: 11/769,411

(22) Filed: Jun. 27, 2007

(51) Int. Cl.
*G11B 5/33* (2006.01)
(52) U.S. Cl. .................................................. 360/31
(58) Field of Classification Search ....................... None
See application file for complete search history.

(56) References Cited

U.S. PATENT DOCUMENTS

| | | | |
|---|---|---|---|
| 4,642,715 A | 2/1987 | Ende | |
| 4,949,036 A | 8/1990 | Bezinque et al. | |
| 5,487,077 A | 1/1996 | Hassner et al. | |
| 5,600,500 A | 2/1997 | Madsen et al. | |
| 5,651,131 A | 7/1997 | Chesley | |
| 5,682,273 A | 10/1997 | Hetzler | |
| 5,872,800 A | 2/1999 | Glover et al. | |
| 5,873,114 A | 2/1999 | Rahman et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 6,052,804 A | 4/2000 | Thowe et al. | |
| 6,181,500 B1 | 1/2001 | Serrano et al. | |
| 6,266,199 B1 * | 7/2001 | Gillis et al. ................... 360/31 | |
| 6,289,484 B1 | 9/2001 | Rothberg et al. | |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |
| 6,393,511 B1 * | 5/2002 | Albrecht et al. ................. 711/4 |
| 6,429,984 B1 * | 8/2002 | Alex ........................... 360/31 |
| 6,490,111 B1 | 12/2002 | Sacks | |
| 6,603,617 B1 | 8/2003 | Cross | |
| 6,606,211 B1 | 8/2003 | Lim et al. | |
| 6,628,466 B2 | 9/2003 | Alex | |
| 6,650,492 B2 | 11/2003 | Lenny et al. | |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 | 10/2004 | Uzumaki et al. | |
| 6,826,007 B1 | 11/2004 | Patton, III | |
| 6,854,022 B1 | 2/2005 | Thelin | |
| 6,854,071 B2 | 2/2005 | King et al. | |

(Continued)

*Primary Examiner*—Mark Blouin
(74) *Attorney, Agent, or Firm*—Howard H. Sheerin, Esq.

(57) ABSTRACT

A disk drive is disclosed including a disk, and a head actuated over the disk. A refresh monitor is maintained for data stored on the disk, wherein the refresh monitor comprises an update function responsive to an operating parameter of the disk drive. A duration monitor is maintained, and the update function of the refresh monitor is modified in response to the duration monitor. The data stored on the disk is refreshed in response to the refresh monitor.

23 Claims, 7 Drawing Sheets

U.S. PATENT DOCUMENTS

| | | | |
|---|---|---|---|
| 6,862,505 B2 | 3/2005 | Satoh et al. | |
| 6,892,249 B1 | 5/2005 | Codilian et al. | |
| 6,895,500 B1 | 5/2005 | Rothberg | |
| 6,898,033 B2 | 5/2005 | Weinstein et al. | |
| 6,947,234 B2 | 9/2005 | Lamberts et al. | |
| 6,948,102 B2 | 9/2005 | Smith | |
| 6,950,967 B1 | 9/2005 | Brunnett et al. | |
| 6,982,842 B2 | 1/2006 | Jing et al. | |
| 6,987,630 B1 | 1/2006 | Higgins et al. | |
| 6,995,933 B1 | 2/2006 | Codilian et al. | |
| 7,006,321 B2 | 2/2006 | Kisaka | |
| 7,023,645 B1 * | 4/2006 | Emo et al. | 360/75 |
| 7,024,614 B1 | 4/2006 | Thelin et al. | |
| 7,032,127 B1 | 4/2006 | Egan et al. | |
| 7,043,598 B2 | 5/2006 | Wu et al. | |
| 7,050,252 B1 | 5/2006 | Vallis | |
| 7,076,604 B1 | 7/2006 | Thelin | |
| 7,082,494 B1 | 7/2006 | Thelin et al. | |
| 7,102,838 B2 | 9/2006 | Kim et al. | |
| 7,120,737 B1 | 10/2006 | Thelin | |
| 7,143,203 B1 | 11/2006 | Altmejd | |
| 7,173,782 B2 | 2/2007 | Ikeda et al. | |
| 7,227,708 B2 | 6/2007 | Feng | |
| 7,345,837 B1 | 3/2008 | Schreck et al. | |
| 7,477,465 B2 | 1/2009 | Yu | |
| 2001/0043424 A1 | 11/2001 | Nguyen | |
| 2003/0007269 A1 | 1/2003 | Alex | |
| 2003/0016461 A1 | 1/2003 | Seng et al. | |
| 2004/0153949 A1 | 8/2004 | Ro et al. | |
| 2004/0174627 A1 | 9/2004 | Kim et al. | |
| 2004/0252397 A1 | 12/2004 | Hodge et al. | |
| 2004/0264028 A1 | 12/2004 | Ishii et al. | |
| 2004/0268033 A1 | 12/2004 | Chia et al. | |
| 2005/0036437 A1 | 2/2005 | Learned et al. | |
| 2005/0078393 A1 | 4/2005 | Cho | |
| 2005/0146803 A1 | 7/2005 | Kim et al. | |
| 2005/0180267 A1 | 8/2005 | Jeong et al. | |
| 2005/0188153 A1 | 8/2005 | Yun et al. | |
| 2005/0207049 A1 | 9/2005 | Ikeda et al. | |
| 2006/0066971 A1 | 3/2006 | Alex et al. | |
| 2006/0098318 A1 | 5/2006 | Feng | |
| 2006/0101197 A1 | 5/2006 | Georgis et al. | |
| 2006/0132954 A1 | 6/2006 | Wada et al. | |
| 2006/0198041 A1 | 9/2006 | Kuwamura | |
| 2007/0076315 A1 | 4/2007 | McMurtrey | |
| 2007/0277011 A1 | 11/2007 | Tanaka et al. | |

* cited by examiner

DISK DRIVE MODIFYING AN UPDATE FUNCTION FOR A REFRESH MONITOR IN RESPONSE TO A MEASURED DURATION

RELATED APPLICATIONS

This application is related to co-pending U.S. patent application titled "DISK DRIVE BIASING A REFRESH MONITOR WITH WRITE PARAMETER OF A WRITE OPERATION", Ser. No. 11/769,447, filed on the same day as the present application and incorporated herein by reference.

BACKGROUND

1. Field

The present invention relates to disk drive for computer systems. In particular, the present invention relates to a disk drive modifying an update function for a refresh monitor in response to a measured duration.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

To protect against catastrophic data loss due to magnetic entropy, the prior art has suggested to maintain refresh monitors for periodically refreshing data (reading and rewriting data) so as to periodically realign the magnetic orientation of the grains. The prior art has also suggested to bias the refresh monitors based on operating parameters. For example, as the ambient temperature increases, the refresh monitor is biased to trigger sooner so that the data is refreshed sooner. However, further improvement is desirable.

SUMMARY OF THE EMBODIMENTS OF THE INVENTION

An embodiment of the present invention comprises a disk drive including a disk, and a head actuated over the disk. A refresh monitor is maintained for data stored on the disk, wherein the refresh monitor comprises an update function responsive to an operating parameter of the disk drive. A duration monitor is maintained, and the update function of the refresh monitor is modified in response to the duration monitor. The data stored on the disk is refreshed in response to the refresh monitor.

In one embodiment, the disk comprises a plurality of refresh zones, and the refresh monitor comprises a plurality of refresh monitors each corresponding to a respective refresh zone.

In another embodiment, the duration monitor tracks a data-lifetime duration after writing data to the disk, and in another embodiment, the duration monitor tracks a drive-lifetime duration after manufacturing the disk drive.

In yet another embodiment, the operating parameter comprises at least one of an ambient temperature, altitude, a fly-height heater parameter, a write current amplitude, a write current overshoot, a skew angle of the head, a width of the head, a data density of data recorded on the disk, and a servo parameter.

In still another embodiment, the update function comprises at least one coefficient, and the update function is modified by modifying the coefficient.

Another embodiment of the present invention comprises a method of operating a disk drive, the disk drive comprising a disk, and a head actuated over the disk. A refresh monitor is maintained for data stored on the disk, wherein the refresh monitor comprises an update function responsive to an operating parameter of the disk drive. A duration monitor is maintained, and the update function of the refresh monitor is modified in response to the duration monitor. The data stored on the disk is refreshed in response to the refresh monitor.

Another embodiment of the present invention comprises a disk drive including a disk, and a head actuated over the disk. A refresh monitor is maintained for data stored on the disk, and a duration monitor is maintained operable to track a drive-lifetime of the disk drive. The refresh monitor is modified in response to the duration monitor, and the data stored on the disk is refreshed in response to the refresh monitor.

DETAILED DESCRIPTION OF EMBODIMENTS OF THE INVENTION

Figure 1B:
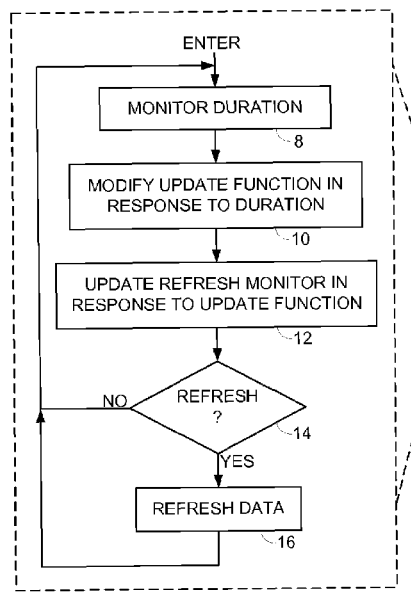
FIG. 1B is a flow diagram executed by the control circuitry according to an embodiment wherein an update function of a refresh monitor is modified in response to a duration monitor.
Figure 1A:
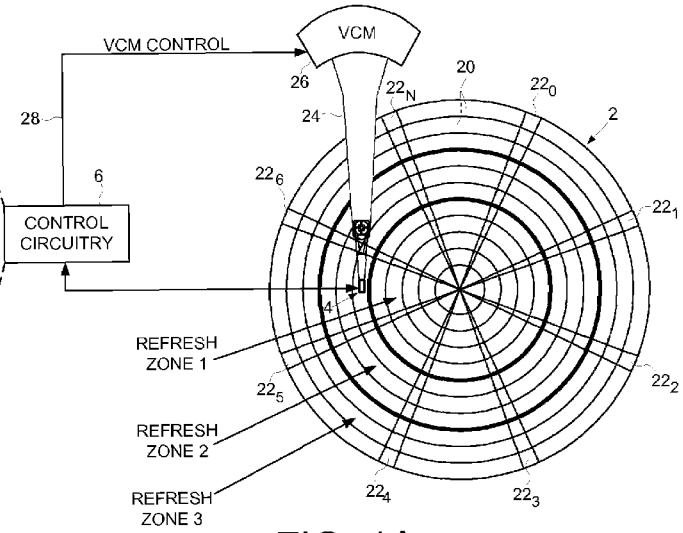
FIG. 1A shows a disk drive according to an embodiment of the present invention comprising a disk, a head actuated over the disk, and control circuitry for refreshing data stored on the disk.

FIG. 1A shows a disk drive according to an embodiment of the present invention including a disk 2, and a head 4 actuated over the disk 2. The disk drive further comprises control circuitry 6 for executing the flow diagram shown in FIG. 1B to refresh data stored on the disk 2. The control circuitry 6 maintains a refresh monitor for data stored on the disk 2, wherein the refresh monitor comprises an update function responsive to an operating parameter of the disk drive. A duration monitor is maintained (step 8), and the update function of the refresh monitor is modified (step 10) in response to the duration monitor. The refresh monitor is updated (step 12) in response to the update function, and when the refresh monitor indicates a refresh is needed (step 14), the data stored on the disk is refreshed (step 16).

In the embodiment of FIG. 1A, the disk 2 comprises a plurality of embedded servo sectors $22_0$-$22_N$ that define a plurality of data tracks 20. The head 4 is connected to a distal end of an actuator arm 24 which is rotated about a pivot by a voice coil motor (VCM) 26 in order to actuate the head 4 radially over the disk 2. The control circuitry 6 processes the read signal emanating from the head 4 to demodulate the information in the embedded servo sectors. The demodulated servo information (position error signal) is then processed (e.g., using appropriate compensation filtering) to generate a position control signal 28 applied to the VCM 26 in order to position the head 4 over a target data track (seek to the target data track and track the centerline of the target data track). In one embodiment, each data track is partitioned into a number of data sectors, wherein write/read operations are performed on one or more data sectors at a time.

FIG. 1A also shows in one embodiment that the data tracks 20 are banded together into a plurality of refresh zones from the inner to outer diameter of the disk. However, the refresh zones may be defined in any suitable manner, including to define the refresh zone relative to logical block addresses or physical block addresses. In one embodiment, the refresh zones may extend across multiple disk surfaces.

Figure 2A:
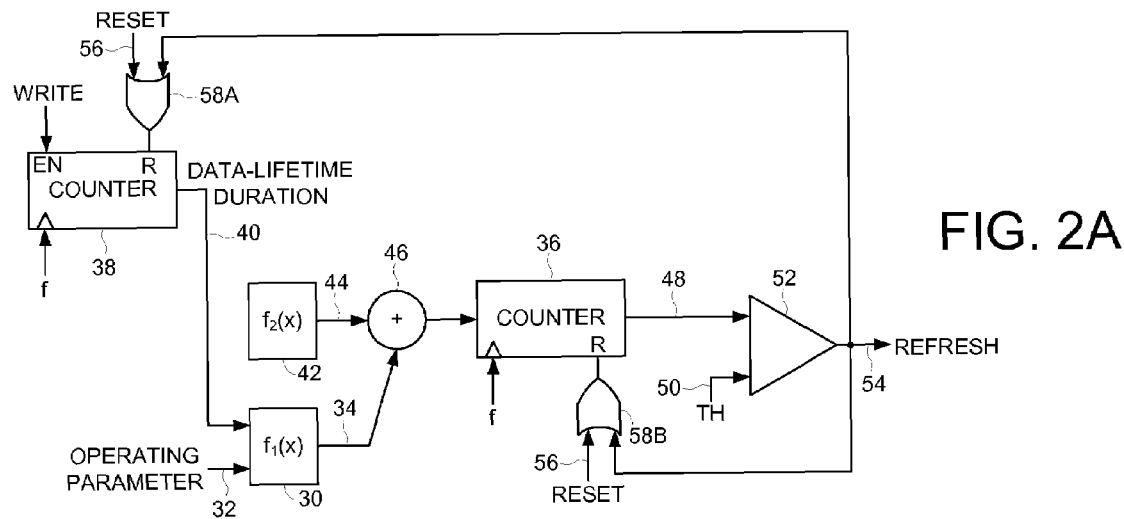
FIG. 2A shows a refresh monitor according to an embodiment of the present invention comprising an update function that is modified in response to a data-lifetime duration.

FIG. 2A shows a refresh monitor that may be implemented by control circuitry 6 according to an embodiment of the present invention, comprising an update function $f_1(x)$ 30 responsive to an operating parameter 32, as well as a duration monitor for tracking a data-lifetime duration. The update function $f_1(x)$ 30 outputs a value 34 that is accumulated by a first counter 36, and a second counter 38 tracks the data-lifetime duration of data written to a corresponding refresh zone. The second counter 38 may be enabled after the first write operation to the refresh zone, and its output 40 is used to modify the update function $f_1(x)$ 30. The embodiment of FIG. 2A also comprises a second update function $f_2(x)$ 42 which outputs an interval value 44 combined at adder 46 with the output 34 of the first update function $f_1(x)$ 30, and the output of adder 46 is accumulated by counter 36. Thus, the refresh monitor of FIG. 2A can be considered as tracking a refresh interval (established by update function $f_2(x)$ 42) biased by an update function $f_1(x)$ 30 responsive to an operating parameter, wherein the update function $f_1(x)$ 30 is modified as the written data ages. The update function $f_2(x)$ 42 that establishes the refresh interval may be implemented in any suitable manner, such as a simple constant or a more sophisticated polynomial responsive to the age of the written data.

The output 48 of counter 36 is compared to a threshold 50 at comparator 52, wherein a refresh signal 54 is activated when the counter output 48 exceeds the threshold 50. The refresh signal 54 initiates a refresh operation for the corresponding refresh zone, and may reset both counters 36 and 38. In one embodiment, if the entire refresh zone is overwritten in response to a host command, both counters 36 and 38 may be reset by a reset signal 56 through OR gates 58A and 58B.

The update function may be responsive to any suitable operating parameter, such as an ambient temperature, an altitude, a fly-height heater parameter, a write current amplitude, a write current overshoot, a skew angle of the head, a width of the head, a data density of data recorded on the disk, and/or a servo parameter. The ambient temperature may be measured locally once for the entire disk drive, or it may be measured for each head for each disk surface in the disk drive. In one embodiment, the disk drive comprises a dynamic fly-height heater for heating the head in order to adjust the fly-height, wherein the operating parameter comprises a heater setting, such as a current applied to the heater. In the embodiment wherein the operating parameter comprises a write current overshoot, the parameter setting may comprise a magnitude or duration of write current overshoot applied to the head. The skew angle of the head is a function of the offset between the reader and writer element, as well as the radial position of the head over the disk, and the width of the head (width of the write element) may be measured using any suitable conventional technique. The data density of the disk may be in the radial direction (number of tracks per inch), or the linear direction (number of bits per inch) which may vary across the radius of the disk. The servo parameter may include any suitable parameter that affects the quality of servo operations, including seeking to a target data track or tracking a centerline of the target data track during write operations. The servo parameter may include, for example, the seek profile, the time to settle on the target data track, the average position error signal while tracking the centerline of the target data track, or a repeatable runout parameter computed prior to tracking. The repeatable runout parameter accounts for eccentricity of the disk and may change over time as the disk expands, or if the disk slips due to a physical shock to the disk drive.

Figure 2B:
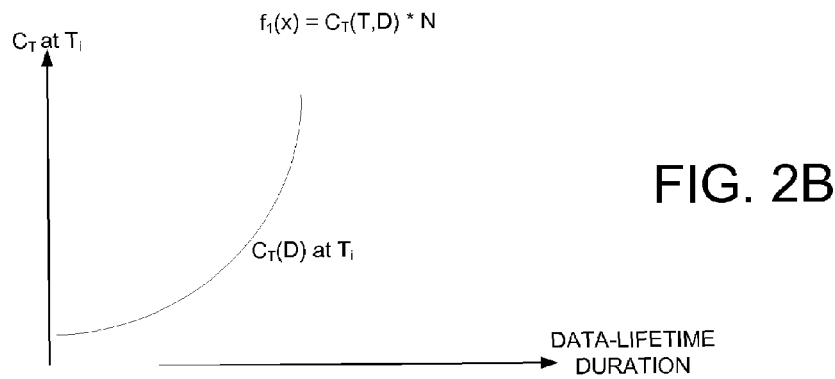
FIG. 2B shows an embodiment of the present invention wherein the update function comprises a coefficient modified by the data-lifetime duration.

The update function $f_1(x)$ 30 may be modified in response to the data-lifetime duration 40 in any suitable manner. For example in one embodiment, the update function $f_1(x)$ 30 comprises at least one coefficient, and the update function $f_1(x)$ 30 is modified by modifying the coefficient. This embodiment may be understood with reference to FIG. 2B which shows the update function $f_1(x)$ 30 as:

$$f_1(x) = C_T(T,D) * N$$

where N is a constant and $C_T$ is a coefficient that is selected in response to the operating parameter (ambient temperature T in this example) and modified by the data-lifetime duration D. The curve shown in FIG. 2B illustrates how the coefficient $C_T$ selected for ambient temperature $T_i$ is modified (increased) as the data-lifetime duration increases. In this example, the output of the update function $f_1(x)$ 30 increases over the data-lifetime duration to compensate for the precipitating affect that the operating parameter has on magnetic entropy as the written data ages. For example, as the written data ages, the bias on the refresh interval is increased for all ranges of ambient temperatures.

Figure 3:
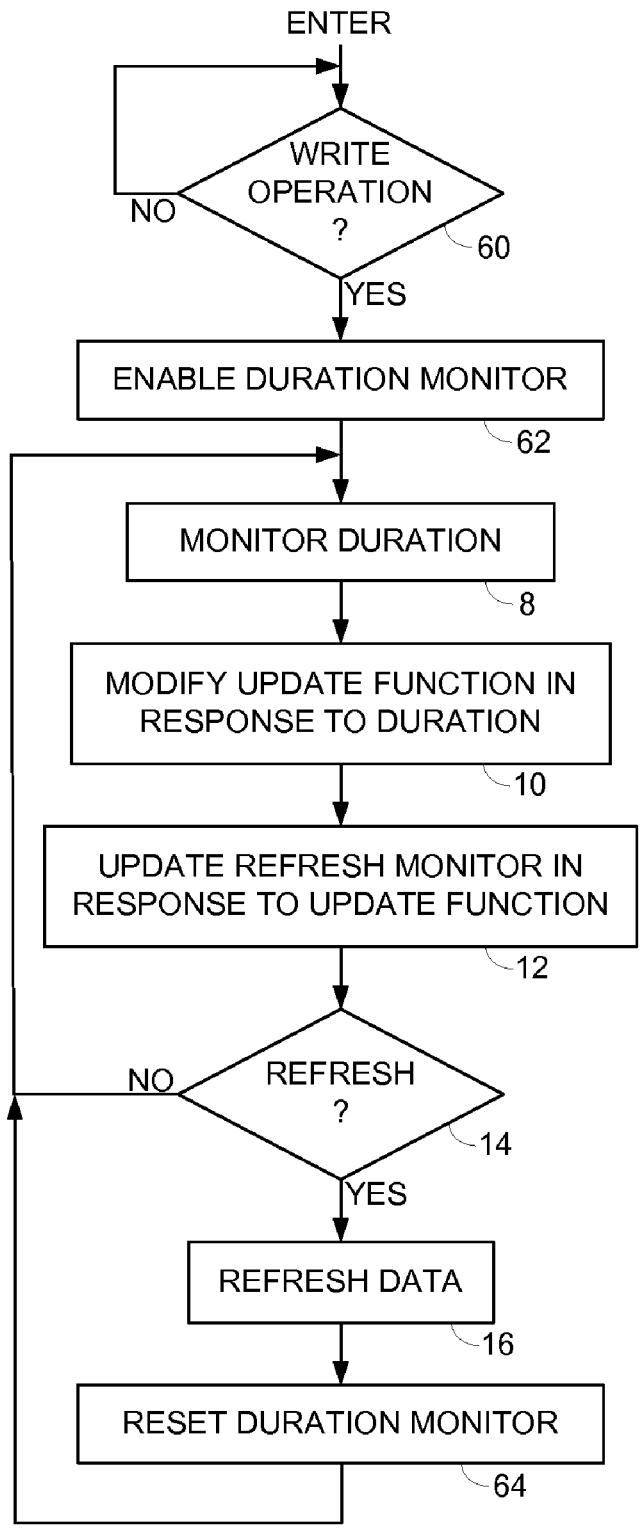
FIG. 3 is a flow diagram according to an embodiment of the present invention wherein the data-lifetime monitor is reset after performing a refresh operation on the data.

FIG. 3 is a flow diagram illustrating an embodiment of the present invention that may be implemented by control circuitry 6 wherein the duration monitor tracks the data-lifetime of data written to a corresponding refresh zone. When a write operation to a refresh zone is performed (step 60), the corresponding duration monitor is enabled (step 62). The duration monitor is maintained (step 8), and the update function of the refresh monitor is modified (step 10) in response to the duration monitor. The refresh monitor is updated (step 12) in response to the update function, and when the refresh monitor indicates a refresh is needed (step 14), the data stored in the refresh zone is refreshed (step 16). After refreshing the data stored in the refresh zone (step 16), the corresponding duration monitor is reset (step 64), and the flow diagram is repeated.

Figure 4A:
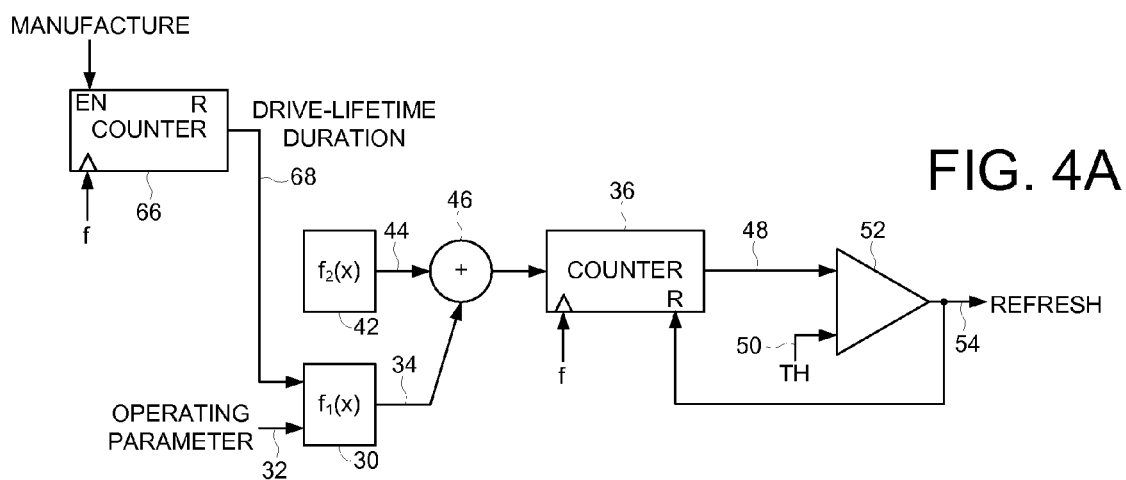
FIG. 4A shows a refresh monitor according to an embodiment of the present invention comprising an update function that is modified in response to a drive-lifetime duration.
Figure 4B:
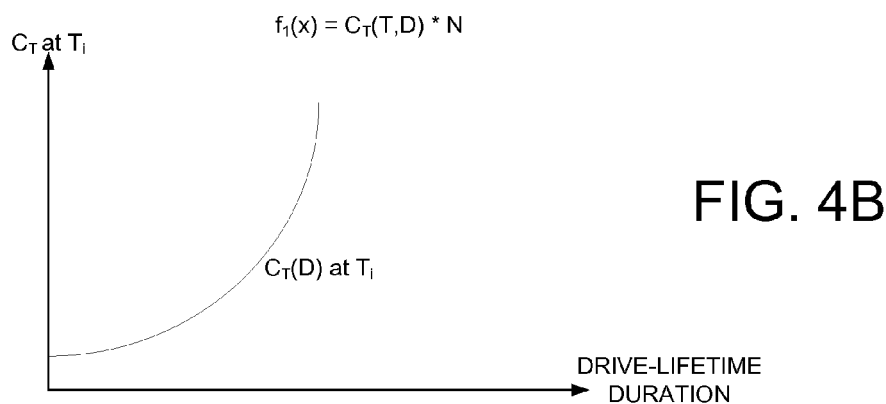
FIG. 4B shows an embodiment of the present invention wherein the update function comprises a coefficient modified by the drive-lifetime duration.

FIG. 4A shows an embodiment of the present invention that may be implemented by control circuitry 6 for a refresh monitor and duration monitor similar to FIG. 2A, wherein a second counter 66 tracks a lifetime of the disk drive (drive-lifetime duration). The counter 66 is enabled after manufacturing the disk drive, and then never reset such that the output 68 of the counter 66 represents the drive-lifetime. The update function $f_1(x)$ 30 is then modified in response to the drive-lifetime duration, for example, by increasing a coefficient that compensates for ambient temperature as illustrated in FIG. 4B. Modifying the update function $f_1(x)$ 30 over the drive-lifetime may help compensate for the precipitating affect that that the operating parameter has on magnetic entropy as one or more components degrade. Example components of FIG. 1A that may degrade over the drive-lifetime include the disk 2, the head 4, the VCM 26, or the spindle motor for rotating the disk (not shown). As these components degrade over time, the operating parameter (e.g., ambient temperature) may have a more pronounced affect on magnetic entropy, and therefore the update function $f_1(x)$ 30 is modified accordingly.

Figure 5A:
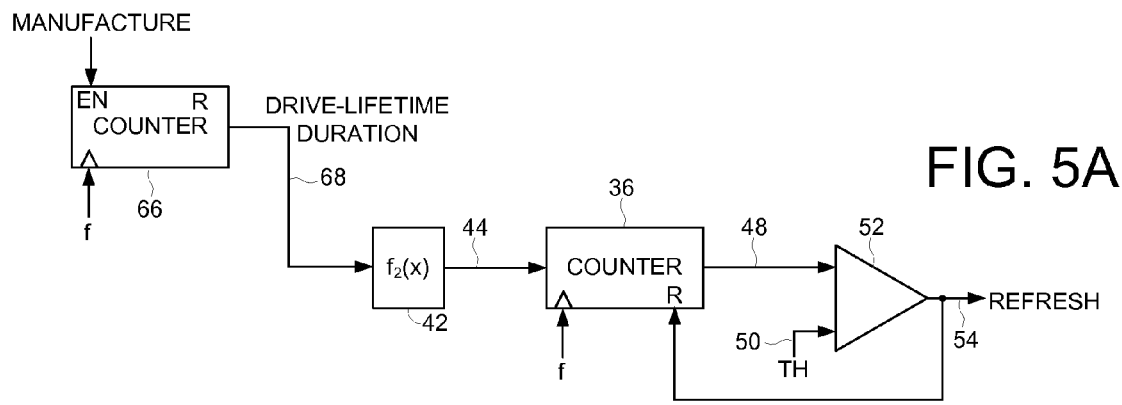
FIG. 5A shows an embodiment of the present invention wherein the drive-lifetime duration modifies the update function that establishes the refresh interval.

FIG. 5A shows an embodiment of the present invention that may be implemented by control circuitry 6 wherein the drive-lifetime duration (output 68 of counter 66) modifies the update function $f_2(x)$ 42 that establishes the refresh interval based on the age of the written data. For example, the drive-lifetime duration may decrease the refresh interval as the components of the disk drive degrade over time so that all of the refresh zones are refreshed more frequently. The update function $f_2(x)$ 42 may be modified in any suitable manner to increase the refresh frequency, such as by increasing a simple constant. In an alternative embodiment, the drive-lifetime duration (output 68 of counter 66) is used to modify the threshold 50 of comparator 52 in order to adjust the refresh interval.

Figure 5B:
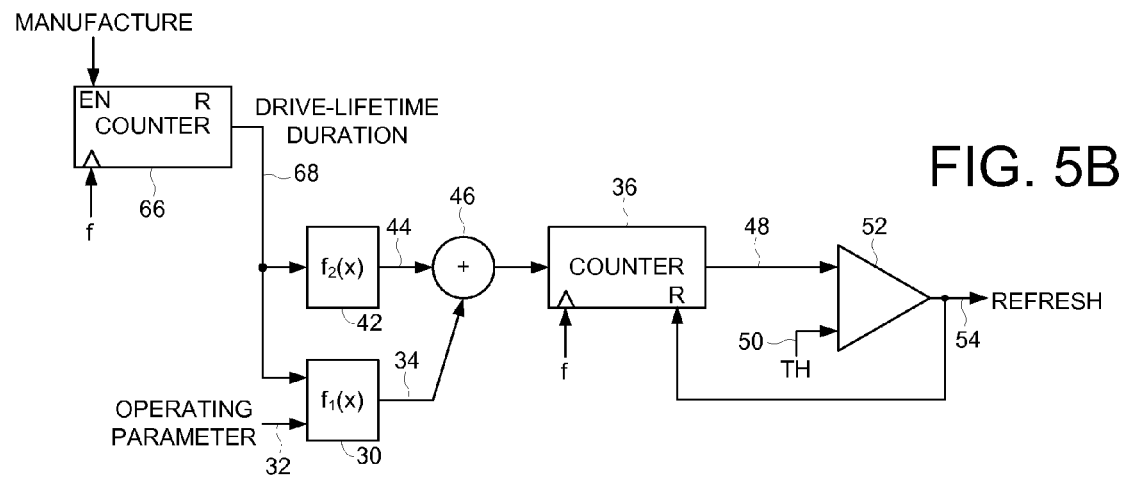
FIG. 5B shows an embodiment of the present invention wherein the drive-lifetime duration modifies the update function that establishes the refresh interval as well as the update function that biases the refresh interval in response to the operating parameter.

FIG. 5B shows an embodiment of the present invention wherein the drive-lifetime duration modifies both the update function $f_2(x)$ 42 that establishes the refresh interval as well as the update function $f_1(x)$ 30 that biases the refresh interval in response to the operating parameter (e.g., ambient temperature). In this embodiment, as the components degrade over time, the refresh interval, as well as the bias applied to the refresh interval in response to the operating parameter, are modified to better compensate for magnetic entropy.

Figure 6A:
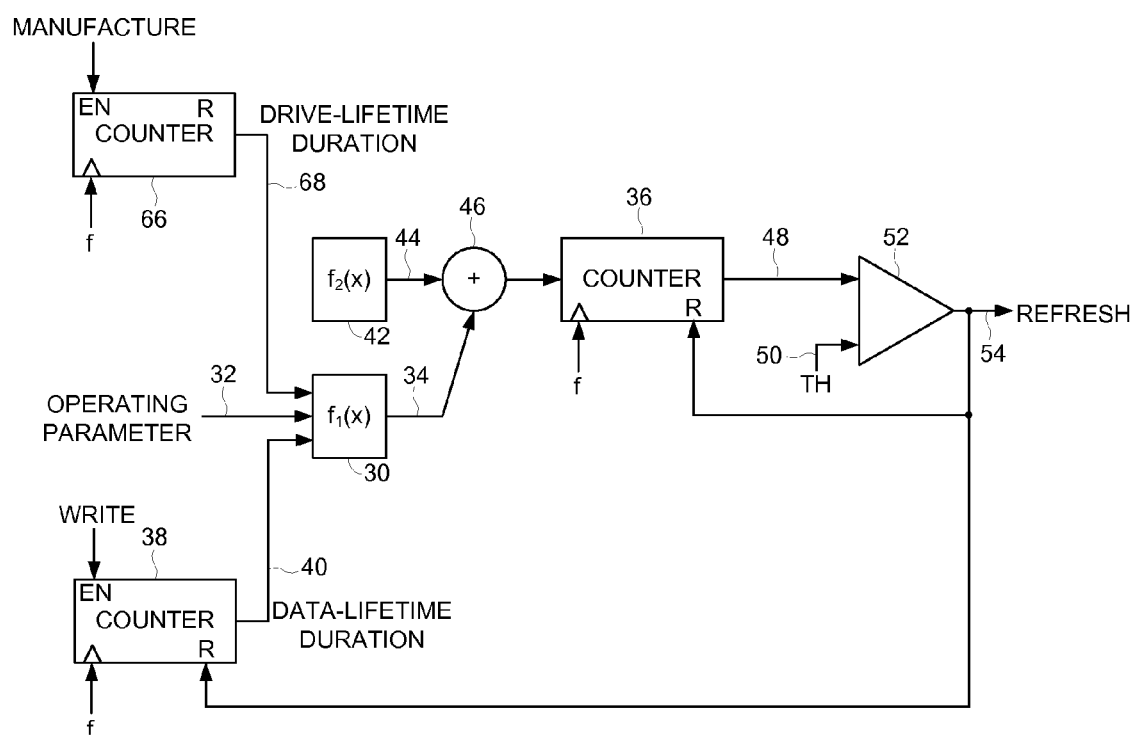
FIG. 6A shows an embodiment of the present invention wherein the update function is modified in response to an operating parameter, a data-lifetime duration, and a drive-lifetime duration.
Figure 6B:
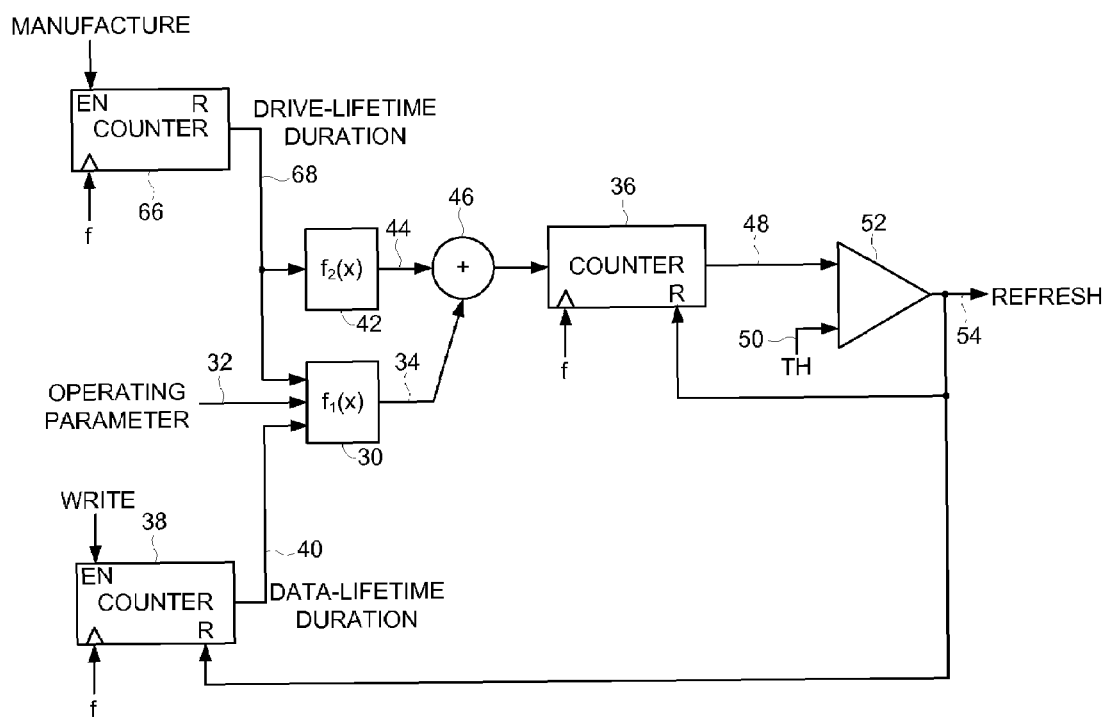
FIG. 6B shows an embodiment of the present invention wherein a first update function is modified in response to an operating parameter, a data-lifetime duration, and a drive-lifetime duration, and a second update function is modified in response to the drive-lifetime duration.

Any suitable combination of embodiments may be combined to form alternative embodiments of the present invention. For example, FIG. 6A shows an embodiment of the present invention wherein the update function $f_1(x)$ 30 is modified in response to the operating parameter 32, the data-lifetime duration 40, and the drive-lifetime duration 68. In one embodiment, the update function $f_1(x)$ 30 comprises a coefficient $C_T$ that is modified similar to FIG. 2B but as a function of both the data-lifetime and drive-lifetime durations. In an alternative embodiment, the update function $f_1(x)$ 30 may be of the form:

$$f_1(x) = C_{1T}(T, \text{data-lifetime}) * N + C_{2T}(T, \text{drive-lifetime}) * N$$

wherein the two coefficients $C_{1T}$ and $C_{2T}$ are modified similar to FIG. 2B and FIG. 4B, respectively. FIG. 6B shows yet another embodiment wherein the first update function $f_1(x)$ 30 is modified in response to the operating parameter 32, the data-lifetime duration 40, and the drive-lifetime duration 68, and the second update function $f_2(x)$ 42 for tracking the refresh interval is modified in response to the drive life-time duration 68.

In the embodiments of the present invention, a suitable technique may be employed to track the duration of the recorded data and/or the lifetime duration of the disk drive while the disk drive is powered down. For example, a rechargeable battery may power timing circuitry while the disk drive is powered down, or the disk drive may obtain suitable timing information (e.g., date information) from a host each time the disk drive is powered on.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 6 comprises suitable logic circuitry, such as state machine circuitry.

What is claimed is:

1. A disk drive comprising:
   a disk;
   a head actuated over the disk; and
   control circuitry operable to:

maintain a refresh monitor for data stored on the disk, wherein the refresh monitor comprises an update function responsive to an operating parameter of the disk drive;
maintain a duration monitor;
modify the update function of the refresh monitor in response to the duration monitor; and
refresh the data stored on the disk in response to the refresh monitor.

2. The disk drive as recited in claim 1, wherein:
the disk comprises a plurality of refresh zones; and
the refresh monitor comprises a plurality of refresh monitors each corresponding to a respective refresh zone.

3. The disk drive as recited in claim 1, wherein the duration monitor tracks a data-lifetime duration after writing data to the disk.

4. The disk drive as recited in claim 1, wherein the duration monitor tracks a drive-lifetime duration after manufacturing the disk drive.

5. The disk drive as recited in claim 1, wherein the operating parameter comprises an ambient temperature.

6. The disk drive as recited in claim 1, wherein the operating parameter comprises a fly-height heater parameter.

7. The disk drive as recited in claim 1, wherein the operating parameter comprises a data density of data recorded on the disk.

8. The disk drive as recited in claim 1, wherein the operating parameter comprises at least one of an ambient temperature, altitude, a fly-height heater parameter, a write current amplitude, a write current overshoot, a skew angle of the head, a width of the head, a data density of data recorded on the disk, and a servo parameter.

9. The disk drive as recited in claim 1, wherein the update function comprises at least one coefficient, and the update function is modified by modifying the coefficient.

10. A method of operating a disk drive, the disk drive comprising a disk, and a head actuated over the disk, the method comprising:
maintaining a refresh monitor for data stored on the disk, wherein the refresh monitor comprises an update function responsive to an operating parameter of the disk drive;
maintaining a duration monitor;
modifying the update function of the refresh monitor in response to the duration monitor; and
refreshing the data stored on the disk in response to the refresh monitor.

11. The method as recited in claim 10, wherein:
the disk comprises a plurality of refresh zones; and
the refresh monitor comprises a plurality of refresh monitors each corresponding to a respective refresh zone.

12. The method as recited in claim 10, wherein the duration monitor tracks a data-lifetime duration after writing data to the disk.

13. The method as recited in claim 10, wherein the duration monitor tracks a drive-lifetime duration after manufacturing the disk drive.

14. The method as recited in claim 10, wherein the operating parameter comprises an ambient temperature.

15. The method as recited in claim 10, wherein the operating parameter comprises a fly-height heater parameter.

16. The method as recited in claim 10, wherein the operating parameter comprises a data density of data recorded on the disk.

17. The method as recited in claim 10, wherein the operating parameter comprises at least one of an ambient temperature, altitude, a fly-height heater parameter, a write current amplitude, a write current overshoot, a skew angle of the head, a width of the head, a data density of data recorded on the disk, and a repeatable runout parameter.

18. The method as recited in claim 10, wherein the update function comprises at least one coefficient, and the update function is modified by modifying the coefficient.

19. A disk drive comprising:
a disk;
a head actuated over the disk; and
control circuitry operable to:
maintain a refresh monitor for data stored on the disk;
maintain a duration monitor operable to track a drive-lifetime of the disk drive;
modify the refresh monitor in response to the duration monitor; and
refresh the data stored on the disk in response to the refresh monitor.

20. The disk drive as recited in claim 19, wherein:
the refresh monitor comprises an update function responsive to an operating parameter of the disk drive; and
the control circuitry is further operable to modify the update function of the refresh monitor in response to the duration monitor.

21. A disk drive comprising:
a disk;
a head actuated over the disk;
a means for maintaining a refresh monitor for data stored on the disk, wherein the refresh monitor comprises a first update function responsive to an operating parameter of the disk drive;
a means for maintaining a duration monitor;
a means for modifying the first update function of the refresh monitor in response to the duration monitor; and
a means for refreshing the data stored on the disk in response to the refresh monitor.

22. The disk drive as recited in claim 21, wherein:
the duration monitor comprises a means for tracking a data-lifetime duration of the data stored on the disk and a drive-lifetime duration of the disk drive; and
the first update function is modified in response to the data-lifetime duration and the drive-lifetime duration.

23. The disk drive as recited in claim 21, wherein:
the duration monitor comprises a means for tracking a data-lifetime duration of the data stored on the disk and a drive-lifetime duration;
the first update function is modified in response to the data-lifetime duration;
the refresh monitor comprises a second update function operable to track a refresh interval; and
further comprising a means for modifying the second update function in response to the drive-lifetime duration.

* * * * *